(12) United States Patent
Becker, Jr.

(10) Patent No.: US 10,578,028 B2
(45) Date of Patent: Mar. 3, 2020

(54) COMPRESSOR BLEED AUXILIARY TURBINE

(71) Applicant: General Electric Company, Schenectady, NY (US)

(72) Inventor: Thomas Lee Becker, Jr., Symmes Township, OH (US)

(73) Assignee: General Electric Company, Schenectady, NY (US)

(*) Notice: Subject to any disclaimer, the term of this patent is extended or adjusted under 35 U.S.C. 154(b) by 779 days.

(21) Appl. No.: 14/828,542

(22) Filed: Aug. 18, 2015

(65) Prior Publication Data
US 2017/0051679 A1    Feb. 23, 2017

(51) Int. Cl.
| | |
|---|---|
| F02C 6/08 | (2006.01) |
| F02C 9/18 | (2006.01) |
| F02K 3/075 | (2006.01) |
| F02C 3/13 | (2006.01) |
| F02C 7/32 | (2006.01) |
| F02C 3/04 | (2006.01) |
| F02C 7/36 | (2006.01) |

(52) U.S. Cl.
CPC .............. *F02C 9/18* (2013.01); *F02C 3/04* (2013.01); *F02C 3/13* (2013.01); *F02C 6/08* (2013.01); *F02C 7/32* (2013.01); *F02K 3/075* (2013.01); *F02C 7/36* (2013.01); *F05D 2220/32* (2013.01); *F05D 2220/62* (2013.01); *F05D 2270/101* (2013.01)

(58) Field of Classification Search
CPC ...... F02C 9/18; F02C 6/08; F02C 3/13; F02C 3/04; F02C 3/10; F02C 3/107; F02C 7/32; F02C 7/36
See application file for complete search history.

(56) References Cited

U.S. PATENT DOCUMENTS

| | | |
|---|---|---|
| 2,625,793 A | 1/1953 | Mierley et al. |
| 2,653,446 A | 9/1953 | Price |
| (Continued) | | |

FOREIGN PATENT DOCUMENTS

| | | |
|---|---|---|
| DE | 42 20 273 A1 | 12/1993 |
| EP | 1728990 A2 | 12/2006 |
| (Continued) | | |

OTHER PUBLICATIONS

European Search Report and Opinion issued in connection with related EP Application No. 16184515.1 dated Jan. 4, 2017.

(Continued)

*Primary Examiner* — William H Rodriguez
(74) *Attorney, Agent, or Firm* — Dority & Manning, P.A.

(57) ABSTRACT

A gas turbine engine is provided having a compressor section, a combustion section, and a turbine section. The compressor section includes one or more compressors and the turbine section includes one or more turbines. The one or more compressors and the one or more turbines are each rotatable about a longitudinal centerline of the gas turbine engine. Additionally, a bleed air flowpath is provided extending between an inlet in airflow communication with the compressor section and an outlet. An auxiliary turbine is positioned in airflow communication with the bleed air flowpath for extracting energy from a flow of bleed air through the bleed air flowpath.

15 Claims, 12 Drawing Sheets

(56) References Cited

U.S. PATENT DOCUMENTS

| | | | |
|---|---|---|---|
| 2,738,645 A | 3/1956 | Destival | |
| 2,749,087 A | 6/1956 | Blackman et al. | |
| 3,353,351 A | 11/1967 | Bill et al. | |
| 3,418,808 A | 12/1968 | Rich | |
| 3,641,766 A | 2/1972 | Uehling | |
| 3,651,645 A | 3/1972 | Grieb | |
| 3,777,489 A | 12/1973 | Johnson et al. | |
| 4,069,661 A | 1/1978 | Rundell et al. | |
| 4,157,010 A | 6/1979 | Sailer | |
| 4,173,120 A | 11/1979 | Grosjean et al. | |
| 4,240,252 A | 12/1980 | Sargisson et al. | |
| 4,304,093 A | 12/1981 | Schulze | |
| 4,376,375 A | 3/1983 | Boudigues | |
| 4,448,019 A | 5/1984 | Klees | |
| 4,631,914 A | 12/1986 | Hines | |
| 4,677,829 A * | 7/1987 | Archer | F01K 23/067 60/39.12 |
| 4,705,452 A | 11/1987 | Karadimas | |
| 4,845,939 A | 7/1989 | Jordan et al. | |
| 4,901,520 A | 2/1990 | Kozak et al. | |
| 5,012,420 A | 4/1991 | Walker et al. | |
| 5,020,318 A | 6/1991 | Vdoviak | |
| 5,363,641 A * | 11/1994 | Dixon | F02C 6/08 60/226.1 |
| 5,383,332 A | 1/1995 | Angel | |
| 5,392,595 A * | 2/1995 | Glickstein | F02C 6/18 60/39.12 |
| 5,414,992 A * | 5/1995 | Glickstein | B64D 13/006 60/39.83 |
| 5,452,573 A | 9/1995 | Glickstein et al. | |
| 5,511,374 A * | 4/1996 | Glickstein | F02C 6/08 60/39.183 |
| 6,190,120 B1 | 2/2001 | Thatcher et al. | |
| 6,234,746 B1 | 5/2001 | Schroeder et al. | |
| 6,305,156 B1 * | 10/2001 | Lui | B64D 13/06 454/76 |
| 6,415,595 B1 * | 7/2002 | Wilmot, Jr. | B64D 13/006 60/266 |
| 6,487,491 B1 | 11/2002 | Karpman et al. | |
| 6,584,778 B1 | 7/2003 | Griffiths et al. | |
| 7,152,410 B2 | 12/2006 | Sheoran et al. | |
| 7,467,518 B1 | 12/2008 | Vermeersch | |
| 7,503,750 B1 | 3/2009 | Violette | |
| 8,096,747 B2 | 1/2012 | Sengar et al. | |
| 8,104,265 B2 | 1/2012 | Kupratis | |
| 8,146,370 B2 | 4/2012 | Zeiner et al. | |
| 8,291,715 B2 * | 10/2012 | Libera | F02C 6/08 60/39.183 |
| 8,596,076 B1 | 12/2013 | Gritton et al. | |
| 8,601,786 B2 | 12/2013 | Hurwitz et al. | |
| 8,720,208 B2 | 5/2014 | Negulescu | |
| 9,239,009 B2 * | 1/2016 | Taguchi | F02C 6/18 |
| 9,284,057 B2 * | 3/2016 | Kelnhofer | B64D 13/06 |
| 9,765,700 B2 * | 9/2017 | Mackin | F02C 6/04 |
| 9,810,158 B2 * | 11/2017 | Foutch | F02C 9/18 |
| 9,850,819 B2 | 12/2017 | Suciu et al. | |
| 9,879,610 B2 * | 1/2018 | Moes | F02C 9/18 |
| 10,100,744 B2 * | 10/2018 | Mackin | F02C 6/08 |
| 10,267,153 B2 | 4/2019 | Morimoto et al. | |
| 2005/0252194 A1 | 11/2005 | Orlando et al. | |
| 2006/0005546 A1 | 1/2006 | Orlando et al. | |
| 2006/0272313 A1 * | 12/2006 | Eick | F02C 3/107 60/39.63 |
| 2007/0125065 A1 | 6/2007 | Renggli et al. | |
| 2007/0151257 A1 * | 7/2007 | Maier | F01D 5/189 60/782 |
| 2009/0016871 A1 | 1/2009 | McCaffrey | |
| 2009/0180872 A1 | 7/2009 | Lundgren | |
| 2009/0196736 A1 | 8/2009 | Sengar et al. | |
| 2009/0211222 A1 | 8/2009 | Roberge | |
| 2009/0288421 A1 * | 11/2009 | Zeiner | F02C 3/10 60/792 |
| 2009/0314002 A1 * | 12/2009 | Libera | F02C 6/08 60/778 |
| 2010/0107594 A1 | 5/2010 | Coffinberry et al. | |
| 2010/0154434 A1 | 6/2010 | Kubota et al. | |
| 2011/0171018 A1 | 7/2011 | Garcia-Crespo | |
| 2012/0093642 A1 * | 4/2012 | Nilsson | F01D 9/04 415/213.1 |
| 2012/0167587 A1 | 7/2012 | Clark et al. | |
| 2013/0025290 A1 | 1/2013 | Glahn | |
| 2013/0187007 A1 * | 7/2013 | Mackin | F02C 6/08 244/134 R |
| 2013/0219918 A1 | 8/2013 | Suciu et al. | |
| 2014/0026588 A1 * | 1/2014 | Velez | F02C 3/13 60/782 |
| 2014/0190180 A1 * | 7/2014 | Soderlund | F02C 7/20 60/797 |
| 2014/0250898 A1 * | 9/2014 | Mackin | F02C 6/08 60/772 |
| 2014/0271101 A1 | 9/2014 | Slavens et al. | |
| 2014/0271113 A1 | 9/2014 | Khalid et al. | |
| 2015/0003963 A1 | 1/2015 | Taketa et al. | |
| 2015/0275758 A1 * | 10/2015 | Foutch | F02C 7/047 60/779 |
| 2015/0292357 A1 | 10/2015 | Todorovic | |
| 2015/0322865 A1 * | 11/2015 | Scipio | F02C 9/18 60/773 |
| 2016/0131037 A1 | 5/2016 | Spangler et al. | |
| 2016/0273402 A1 * | 9/2016 | Ekanayake | F01K 23/10 |
| 2016/0312704 A1 | 10/2016 | Suciu et al. | |
| 2016/0326878 A1 | 11/2016 | Morimoto et al. | |
| 2016/0347463 A1 | 12/2016 | Negulescu | |
| 2017/0051678 A1 | 2/2017 | Becker, Jr. | |
| 2017/0268430 A1 * | 9/2017 | Schwarz | B64D 13/06 |
| 2018/0009536 A1 * | 1/2018 | Christopherson | B64D 13/06 |
| 2018/0051703 A1 * | 2/2018 | Roberge | F04D 25/163 |
| 2018/0058333 A1 * | 3/2018 | Foutch | F02C 9/18 |
| 2018/0080383 A1 * | 3/2018 | Snape | F02C 7/185 |
| 2018/0162537 A1 * | 6/2018 | Schwarz | B64D 13/08 |

FOREIGN PATENT DOCUMENTS

| | | |
|---|---|---|
| EP | 2009269 A2 | 12/2008 |
| EP | 2093376 A2 | 8/2009 |
| EP | 2820255 | 1/2015 |
| EP | 2881552 A1 | 6/2015 |
| FR | 2961857 A1 | 12/2011 |
| GB | 2057574 B | 4/1981 |
| GB | 2377973 A | 1/2003 |
| JP | S5416014 A | 2/1979 |
| JP | S61234232 A | 10/1986 |
| JP | H3-160143 A | 7/1991 |
| JP | H7-91279 A | 4/1995 |
| JP | 2007-510091 A | 4/2007 |
| JP | 2007182725 A | 7/2007 |
| JP | 2010038071 A | 2/2010 |
| JP | 2015/145644 A | 8/2015 |
| WO | 0157380 A1 | 8/2001 |

OTHER PUBLICATIONS

European Search Report and Opinion issued in connection with related EP Application No. 16184516.9 dated Jan. 5, 2017.

European Search Report and Opinion issued in connection with corresponding EP Application No. 16184522.7 dated Jan. 12, 2017.

GE Related Case Form.

Machine translation and a Notification of Reasons for Refusal issued in connection with corresponding JP Application No. 2016-156069 dated Jun. 27, 2017.

Machine translation and a First Office Action and Search issued in connection with corresponding CN Application No. 201610683698.0 dated Jul. 12, 2017.

Chinese Office Action Corresponding to Application No. 2016106836995 on Jun. 27, 2019.

* cited by examiner

COMPRESSOR BLEED AUXILIARY TURBINE

FIELD OF THE INVENTION

The present subject matter relates generally to a gas turbine engine having an auxiliary turbine in airflow communication a bleed air flowpath.

BACKGROUND OF THE INVENTION

A gas turbine engine generally includes a fan and a core arranged in flow communication with one another. A first portion of air over the fan may flow past the core through a bypass airflow (defined between the core and an outer nacelle) and a second portion of air over the fan may be provided to the core.

The core of the gas turbine engine generally includes, in serial flow order, a compressor section, a combustion section, a turbine section, and an exhaust section. In operation, the air provided to the core flows through the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Typical gas turbine engines also include a plurality of bleed air flow paths in airflow communication with the compressor section. For example, if the compressor section includes a low pressure compressor and a high pressure compressor, the plurality of bleed air flow paths can be in airflow communication with the low pressure compressor. Depending on certain operating conditions of the gas turbine engine, at least a portion of an airflow through the low pressure compressor can be diverted through the bleed air flowpaths to, e.g., the bypass airflow or atmosphere. Providing at least a portion of the airflow from the low pressure compressor through the bleed air flow paths to, e.g., the bypass airflow or atmosphere, may assist in controlling certain parameters of the gas turbine engine (e.g., reducing an overall pressure ratio of the compressor section). Reducing the overall pressure ratio can increase a stall margin of the gas turbine engine.

However, providing a portion of the airflow from the low pressure compressor through the bleed air flow paths can result in a decreased efficiency of the gas turbine engine. For example, any energy in the portion of the airflow from the low pressure compressor provided through the bleed air flow paths to atmosphere may be lost with such a configuration. Accordingly, a gas turbine engine capable of bleeding air from a compressor section while reducing unnecessary energy loss would be beneficial. More particularly, a gas turbine engine capable of capturing energy within a flow of bleed air would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section including one or more compressors, a combustion section located downstream of the compressor section, and a turbine section located downstream of the combustion section. The turbine section includes one or more turbines. The gas turbine engine also includes a bleed air flowpath extending between an inlet and an outlet, the inlet in airflow communication with the compressor section for receiving a flow of bleed air from the compressor section. The gas turbine engine also includes an auxiliary turbine positioned in airflow communication with the bleed air flowpath between the inlet of the bleed air flowpath and the outlet of the bleed air flowpath for extracting energy from the flow of bleed air through the bleed air flowpath.

In another exemplary embodiment of the present disclosure, a gas turbine engine is provided. The gas turbine engine includes a compressor section including one more compressors and a turbine section located downstream of the compressor section and including one or more turbines. The gas turbine engine also includes a bleed air flowpath extending between an inlet and an outlet. The inlet is in airflow communication with the compressor section for receiving up to at least five percent of an airflow through the compressor section. The gas turbine engine also includes an auxiliary turbine positioned in airflow communication with the bleed air flowpath between the inlet of the bleed air flowpath and the outlet of the bleed air flowpath for extracting energy from the flow of bleed air through the bleed air flowpath.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
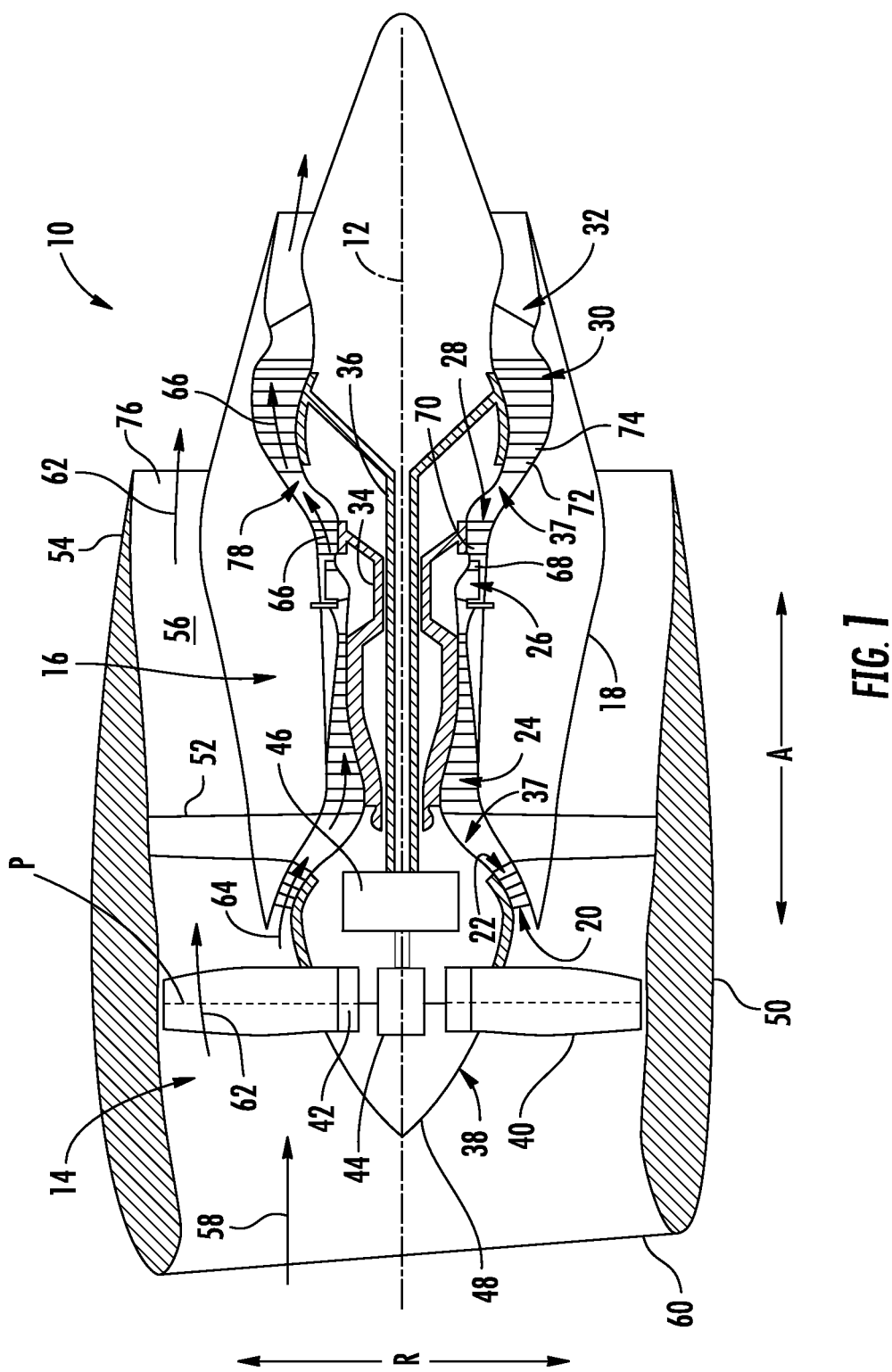
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 may also define a circumferential direction C (not shown) extending circumferentially about the axial direction A. In general, the turbofan 10 includes a fan section 14 and a core turbine engine 16 disposed downstream from the fan section 14.

The exemplary core turbine engine 16 depicted is generally enclosed within a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24. The second portion of air 64 then flows into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools. Additionally, or alternatively, aspects of the present disclosure may be incorporated into any other suitable gas turbine engine. For example, in other exemplary embodiments, aspects of the present disclosure may be incorporated into a turboshaft engine, a turbocore engine, a turboprop engine, a turbojet engine, etc.

Figure 2:
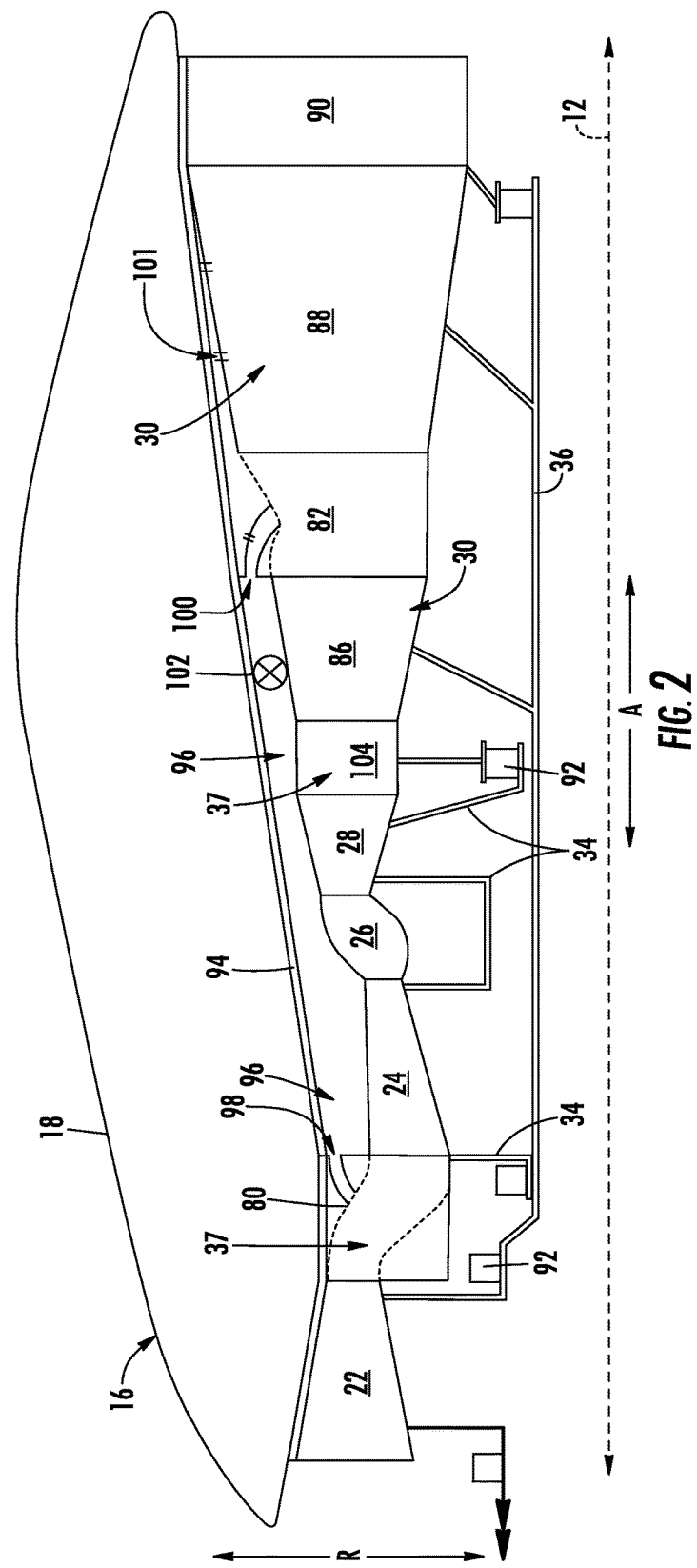
FIG. 2 is a simplified, schematic view of a core of a gas turbine engine in accordance with an exemplary embodiment of the present disclosure.

Referring now to FIG. 2, a simplified, schematic view of a core 16 of a turbofan engine 10 in accordance with another exemplary embodiment is provided. In certain embodiments, aspects of the core 16 of the exemplary turbofan engine 10 depicted in FIG. 2 may be configured in a similar manner as the exemplary turbofan engine 10 described above with reference to FIG. 1. Accordingly, the same numbering refers to the same or similar component.

As shown, the core 16 of the turbofan engine 10 includes a compressor section, a combustion section 26 located downstream of the compressor section, and a turbine section located downstream of the combustion section 26. The compressor section generally includes an LP compressor 22, an HP compressor 24, and a compressor frame member 80 positioned between the LP compressor 22 and the HP compressor 24. Additionally, the turbine section generally includes an HP turbine 28, an LP turbine 30, and, as will be discussed in greater detail below, a stage 82 of airflow injection nozzles 84 (see FIG. 8). For the embodiment depicted, the LP turbine 30 is split between an LP turbine forward block 86 and an LP turbine aft block 88, and the stage 82 of airflow injection nozzles 84 is positioned between the LP turbine forward block 86 and the LP turbine aft block 88. The turbine section additionally includes a turbine rear frame 90 located aft of, or downstream of, the LP turbine 30.

As is also discussed above, the turbofan engine 10 includes one or more shafts mechanically coupling the compressor section and the turbine section. Specifically, for the embodiment depicted, the LP compressor 22 is coupled mechanically to the LP turbine 30 through the LP shaft 36, and the HP compressor 24 is coupled mechanically to the HP turbine 28 through the HP shaft 34. A plurality of bearings 92 are provided to facilitate the rotation of these various components.

Additionally, the compressor section, the combustion section 26, and the turbine section are all at least partially enclosed in an outer casing 18. The outer casing 18 may be a substantially tubular outer casing enclosing the core 16 of the turbofan engine 10 and at least partially defining the bypass airflow passage 56 with a fan casing/outer nacelle 50.

Moreover, the core 16 of the exemplary turbofan engine 10 includes a structural member 94 extending from the compressor section to the turbine section for strengthening the turbofan engine 10. Specifically, for the embodiment depicted, the structural member 94 is positioned inwardly of the outer casing 18 of the core 16 along the radial direction R, and extends at least from the compressor frame member 80, located between the LP compressor 22 and the HP compressor 24, to the stage 82 of airflow injection nozzles 84, located between the forward block 86 of the LP turbine 30 and the aft block 88 the LP turbine 30. The structural member 94 may add structural rigidity and support to the core 16 of the turbofan engine 10. Although not depicted, the structural member 94 may include one or more braces extending between the structural member 94 and, e.g., the outer casing 18. The structural member 94 may be formed of a single piece of rigid material, such as a suitable metal material, and may define a substantially annular shape enclosing at least a portion of the compressor section, combustion section 26, and the turbine section (see also the embodiment depicted in FIG. 4). Alternatively, however, the structural member 94 may be formed of a plurality of individual components attached in any suitable manner to extend continuously between the compressor section and the turbine section. It should be appreciated, that as used herein, the continuously extending structural member 94 may include one or more ports allowing for a flow of at least a portion of the bleed air flowing through the bleed air flowpath to be diverted to one or more auxiliary systems of the engine or an aircraft to which the engine is mounted.

Further, the exemplary structural member 94 defines a flowpath 96 extending between an inlet 98 and an outlet 100. Specifically, the exemplary flowpath 96 depicted is defined by the structural member 94 and a radially outer portion of the compressor section, the combustion section 26, and the turbine section. Alternatively, however, in certain exemplary embodiments, the core 16 may additionally include an inner liner positioned between the stationary member 94 and the outer portion of one or more of the compressor section, combustion section 26, and turbine section. With such a configuration, the flowpath 96 may be defined by the structural member 94 and, at least in part, by the inner liner.

The flowpath 96 defined by the structural member 94 operates as a bleed air flowpath, and thus the inlet 98 of the flowpath 96 is in airflow communication with the compressor section for receiving a flow of bleed air from the compressor section. Specifically, for the embodiment depicted, the inlet 98 of the flowpath 96 is in airflow communication with a portion of the core air flowpath 37 extending through the compressor frame member 80 via an opening.

Additionally, the flowpath 96 defined by the structural member 94 is configured to provide the flow of bleed air therethrough to the turbine section. Accordingly, the outlet 100 of the flowpath 96 is in airflow communication with the turbine section. Specifically, the outlet 100 is in airflow communication with a portion of the core air flowpath 37 extending through the LP turbine 30 via the stage 82 of airflow injection nozzles 84. The flowpath 96 defined by the structural member 94 may thus provide or reintroduce—e.g., through the stage 82 of airflow injection nozzles 84—the flow of bleed air, pressurized by the LP compressor 22, back into a portion of the core air flowpath 37 extending through the LP turbine 30. With such a configuration, the energy in the flow of bleed air may be extracted therefrom. For example, the energy in the flow of bleed air may be used to assist with driving the LP turbine 30 and providing rotational power to the LP shaft 36.

Moreover, for the exemplary embodiment depicted, a portion of the flow of bleed air provided through the flowpath 96 may additionally be directed downstream of the stage 82 of bypass injection nozzles 86. For example, as is shown, a portion of the flow of bleed air through the flowpath 96 is additionally provided to the aft block 88 of the LP turbine 30, e.g., through one or more openings 101. Furthermore, although not depicted, a portion of the flow of bleed air provided through the flowpath 96 may additionally be provided to, e.g., the turbine rear frame 90 or a nozzle portion of the core 16 (not shown).

Referring still to FIG. 2, in order to regulate an amount of airflow provided through the flowpath 96 defined by the structural member 94, a valve 102 is provided. The exemplary valve 102 depicted is positioned in the flowpath 96 defined by the structural member 94 and is configured to vary an amount of airflow allowed through the flowpath 96 defined by the structural member 94. For example, the valve 102 may be a variable throughput valve movable between an open position, allowing complete airflow through the flowpath 96 defined by the structural member 94, and a closed position, preventing all airflow through the flowpath 96 defined by structural member 94. Additionally, the valve 102 may be movable to various positions between the open position and the closed position to regulate an amount of airflow allowable through the flowpath 96 defined by the structural member 94. The valve 102 may be in operable communication with, e.g., a controller of the turbofan engine 10 and/or an aircraft including the turbofan engine 10.

It should be appreciated, that the flowpath 96 defined by the structural member 94 may be configured to allow for a relatively substantial amount of bleed air flow therethrough. For example, the compressor section may define a maximum flow rate therethrough and the flowpath 96 may also define a maximum flow rate therethrough. As used herein, the term "maximum flow rate" refers to the maximum amount of airflow that the respective component(s) can accommodate during normal operation of the turbofan engine 10. In at least certain exemplary embodiments, the maximum flow rate through the flowpath 96 defined by the structural member 94 may be at least about five percent of the maximum flow rate through the compressor section. Alternatively, however, in other exemplary embodiments, the maximum flow rate through the flowpath 96 defined by the structural member 94 may be at least about ten percent of the maximum flow rate through the compressor section, at least about twenty-five percent of the maximum flow rate through the compressor section, at least about forty percent of the maximum flow rate through the compressor section, at least about fifty percent of the maximum flow rate through the compressor section, at least about seventy-five percent of the maximum flow rate to the compressor section, or at least about one hundred percent of the maximum flow rate to the compressor section. Thus, in certain exemplary embodiments, the core 16 of the turbofan engine 10 may define a bleed air ratio (i.e., a ratio of an amount of airflow through the flowpath 96 to an amount of airflow through the compressor section) of up to about 1:1. It should be appreciated that as used herein, terms of approximation, such as "about" and "approximately," refer to being within a 10 percent margin of error.

Accordingly, in one or more of the above embodiments, the inlet 98 of the flowpath 96 may be configured for receiving up to at least about five percent of an airflow through the compressor section, or more particularly, of an airflow through the core air flowpath 37 extending through the LP compressor 22 of the compressor section. Alternatively, however in other embodiments, the inlet 98 of the flowpath 96 may additionally be configured for receiving up to at least about ten percent, up to at least about twenty percent, up to at least about thirty percent, up to at least about forty percent, or up to at least about fifty percent of an airflow flowing through the core air flowpath 37 extending through the LP compressor 22 of the compressor section.

Notably, providing a flow of bleed air from the compressor section (e.g., a portion of the core air flowpath 37 located immediately downstream of the LP compressor 22) may assist in controlling certain parameters of the turbofan engine 10. For example, bleeding off at least a portion the airflow from the LP compressor 22 through the flowpath 96 defined by the structural member 94 can allow for a reduction in an overall pressure ratio of the compressor section, which depending on the operating conditions of the turbofan engine 10, can increase a stall margin of the turbofan engine 10.

It should be appreciated, however, that the exemplary embodiment depicted in FIG. 2 and described above is provided by way of example only. For example, the inlet 98 of the flowpath 96 defined by the structural member 94 may alternatively be directly in airflow communication with the LP compressor 22 (e.g., at an aft end of the LP compressor 22). Similarly, in other exemplary embodiments, the outlet 100 of the flowpath 96 defined by the structural member 94 may instead be in airflow communication with a turbine frame member 104 located upstream of the LP turbine 30. Accordingly, in certain exemplary embodiment, the core 16 of the turbofan engine 10 may not include the compressor frame member 80 and/or may not include the stage 82 of airflow injection nozzles 84 located between a forward block 86 of the LP turbine 30 and an aft block 88 of the LP turbine 30. For example, in certain exemplary embodiments, the LP turbine 30 may be a single unit, not split up between a forward block 86 and an aft block 88, and the stage 82 of airflow injection nozzles 84 may be located upstream of the LP turbine 30 (e.g., where the turbine frame member 104 is depicted in FIG. 2). Further, in still other embodiments, the core 16 may not include the turbine rear frame 90 located aft of the LP turbine 30.

Figure 3:
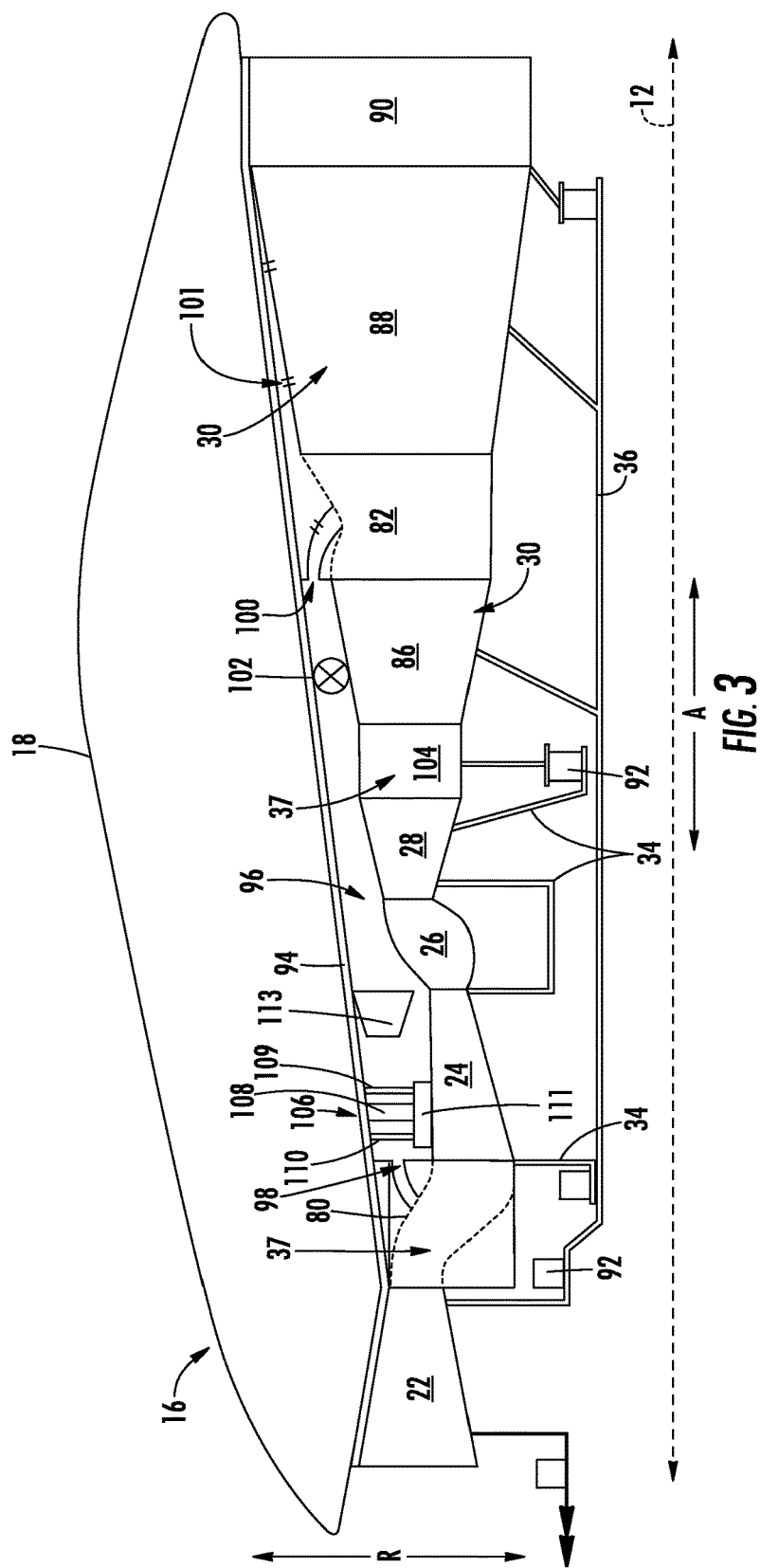
FIG. 3 is a simplified, schematic view of a core of a gas turbine engine in accordance with another exemplary embodiment of the present disclosure.

Referring now to FIG. 3, a simplified, schematic view of a core 16 of a turbofan engine 10 in accordance with another exemplary embodiment of the present disclosure is provided. The core 16 of the exemplary embodiment of FIG. 3 may be configured in substantially the same manner as the exemplary core 16 described above and depicted in FIG. 2. Accordingly, the same or similar numbering may refer to the same or similar components.

For example, the exemplary core 16 depicted in FIG. 3 includes a compressor section, a combustion section 26 located downstream of the compressor section, and a turbine section located downstream of the combustion section 26. The compressor section includes one or more compressors (i.e., an LP compressor 22 and an HP compressor 24) and the turbine section includes one or more turbines (i.e., an HP turbine 28 and an LP turbine 30). The LP compressor 22 and HP compressor 24 of the compressor section, as well as the HP turbine 28 and the LP turbine 30 of the turbine section, are each rotatable about the longitudinal centerline 12 of the turbofan engine 10.

Additionally, the exemplary core 16 depicted in FIG. 3 includes a structural member 94 extending from the compressor section to the turbine section for strengthening the core 16 of the turbofan engine 10. The exemplary structural member 94 also at least partially defines a flowpath 96 extending between an inlet 98 in airflow communication with the compressor section and an outlet 100 in airflow communication with the turbine section. However, for the embodiment depicted in FIG. 3, the core 16 of the turbofan engine 10 includes additional components to utilize and/or enhance a flow of bleed air from the compressor section to the turbine section through the flowpath 96 defined by the structural member 94.

Figure 4:
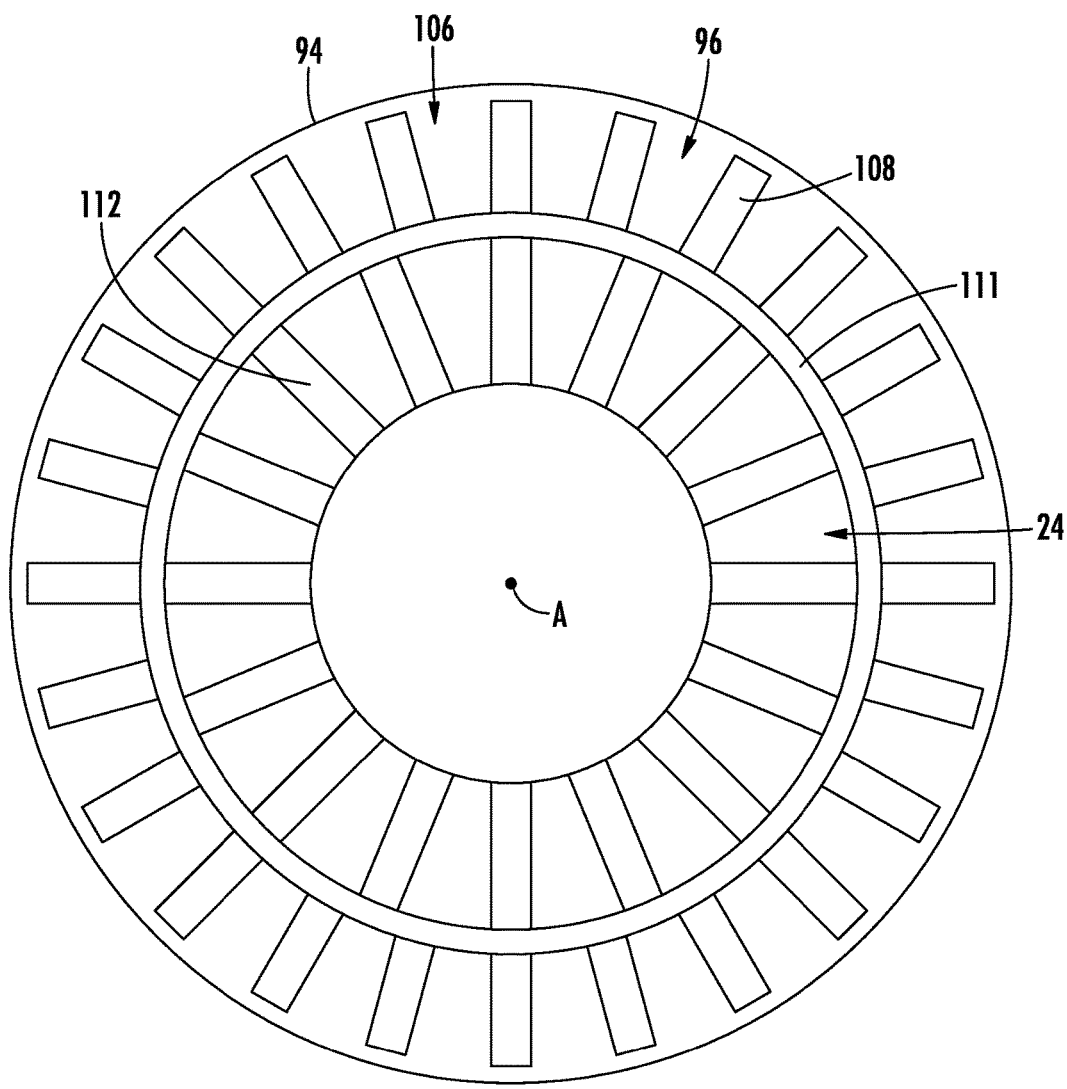
FIG. 4 is a schematic view of an auxiliary compressor in accordance with an exemplary embodiment of the present disclosure.

For example, with reference now also to FIG. 4, the exemplary core 16 depicted in FIG. 3 additionally includes an auxiliary compressor 106 in airflow communication with the flowpath 96 defined by the structural member 94. For the embodiment depicted, the auxiliary compressor 106 is a fan mechanically coupled to the HP shaft 34 through the HP compressor 24 (i.e., a core-driven fan). As is depicted schematically in FIG. 3, the auxiliary compressor 106 includes a stage of auxiliary compressor blades 108, a stage of inlet guide vanes 110 located upstream of the blades 108, and a stage of outlet guide vanes 109 located downstream of the blades 108. Moreover, the plurality of auxiliary compressor blades 108 are attached to a solid ring 111, which is in turn attached at a radially outer end of a stage of HP compressor rotor blades 112 and rotatable with the stage of HP compressor rotor blades 112 (FIG. 4). The auxiliary compressor 106 may be configured to increase a pressure of the flow of bleed air through the flowpath 96 during operation.

Additionally, the exemplary auxiliary compressor 106 includes an ability to vary an amount of airflow allowed therethrough. Specifically, as stated, the exemplary auxiliary compressor 106 includes a plurality of inlet guide vanes 110 over an inlet of the auxiliary compressor 106. The inlet guide vanes 110 may be movable between a fully open position, allowing complete flow through the auxiliary compressor 106, and a fully closed position restricting at least a portion of the flow through the auxiliary compressor 106. Thus, the inlet guide vanes 110 may be configured as variable inlet guide vanes and may work in conjunction with the valve 102 to regulate the flow of bleed air through the flowpath 96 defined by the structural member 94. Alternatively, in certain exemplary embodiments, inclusion of variable inlet guide vanes 110 in the auxiliary compressor 106 may obviate the need for the valve 102 altogether (and thus such an exemplary embodiment may not include the valve 102). Alternatively, in still other exemplary embodiments, the flowpath 96 may bypass the auxiliary compressor 106 when the inlet guide vanes 110 are in the fully closed position. For example, in certain exemplary embodiments the core 16 may define a bypass line (not shown) capable of bypassing operation of the auxiliary compressor 106.

Inclusion of the auxiliary compressor 106 may allow for additional energy to be extracted from the flow of bleed air through the flowpath 96 defined by the structural member 94. Additionally, wherein, for example, the auxiliary compressor 106 is driven by the HP shaft 34, the auxiliary compressor 106 may be a means for certain high pressure components of the core 16 (e.g., the HP compressor 24) to drive certain low pressure components of the core 16 (e.g. the LP turbine 30). Notably, the above benefits may occur while still allowing the core 16 to bleed air from the low pressure operation line, e.g., from the LP compressor 22.

Referring still to FIG. 3, the turbofan engine 10, or rather the core 16 of the turbofan engine 10, additionally includes a heat exchanger 113 in airflow communication with the flowpath 96 defined by the structural member 94. For the embodiment depicted, the heat exchanger 113 is located downstream of the auxiliary compressor 106 at least partially within the flowpath 96 defined by the structural member 94. However, in other exemplary embodiments, the heat exchanger 113 may alternatively be positioned upstream of the auxiliary compressor 106 at least partially within the flowpath 96 defined by the structural member 94.

The heat exchanger 113 may be configured to transfer heat from one or more systems of the turbofan engine 10 to the flow bleed air in the flowpath 96 defined by structural member 94. For example, the heat exchanger 113 may be configured to transfer heat from a main lubrication system of the core 16 of the turbofan engine 10 to the flow of bleed air in the flowpath 96 defined by the structural member 94. Additionally, although not depicted, in other embodiments, the core 16 of the turbofan engine 10 may additionally include a plurality of heat exchangers 113 in airflow communication with the flowpath 96 defined by the structural member 94, spaced along the flowpath 96 defined by the structural member 94 in any suitable manner.

Inclusion of one or more heat exchangers 113 in the flowpath 96 defined by the structural member 94 may allow for greater thermal control of the thermal management systems of the turbofan engine 10, while also adding energy to the flow of bleed air.

Figure 5:
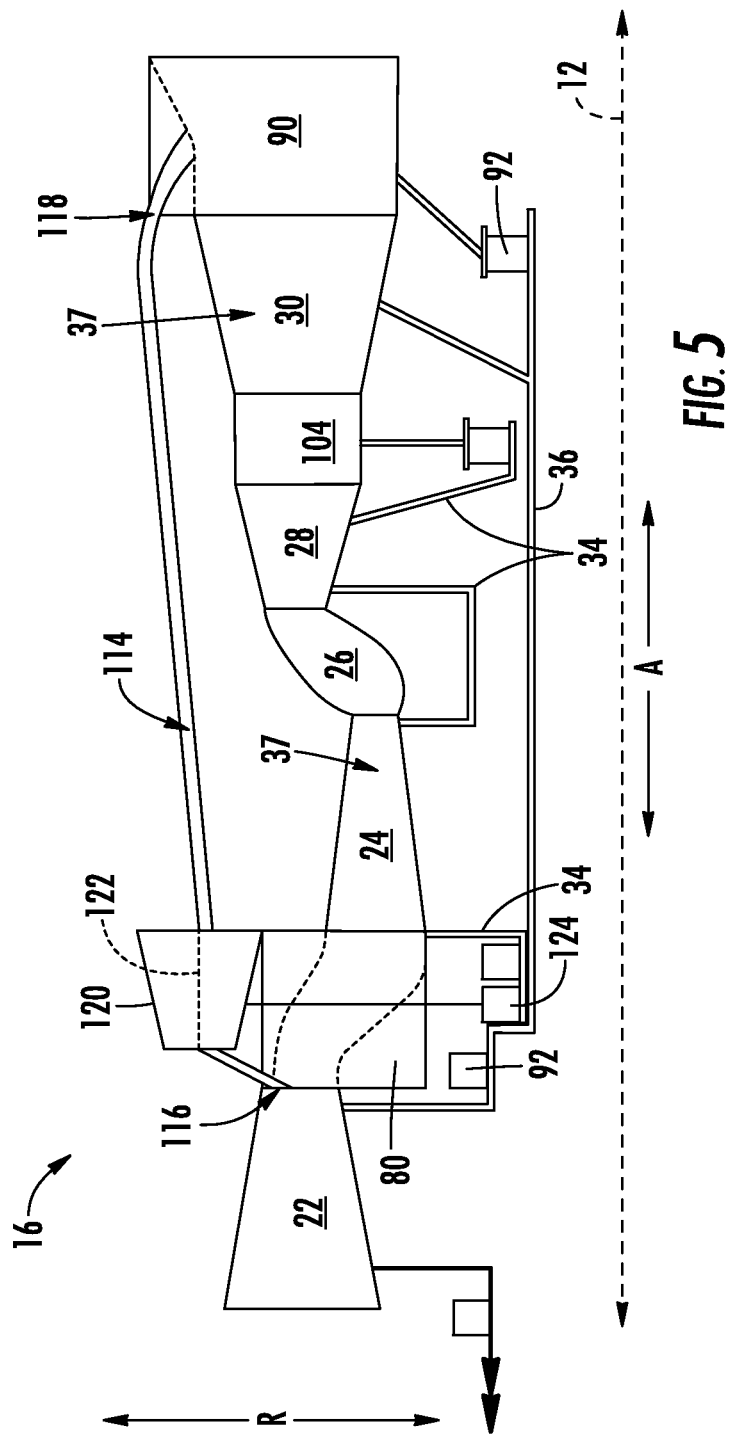
FIG. 5 is a simplified, schematic view of a core of a gas turbine engine in accordance with yet another exemplary embodiment of the present disclosure.

Referring now to FIG. 5, a simplified, schematic view of a core 16 of a turbofan engine 10 in accordance with still another exemplary embodiment of the present disclosure is provided. The core 16 of the exemplary embodiment of FIG. 5 may be configured in substantially the same manner as the exemplary core 16 described above with reference to FIG. 2. Accordingly, the same or similar numbering may refer to the same or similar components.

For example, the exemplary core 16 depicted in FIG. 5 includes a compressor section, a combustion section 26 located downstream of the compressor section, and a turbine section located downstream of the combustion section 26. The compressor section includes one or more compressors (i.e., an LP compressor 22 and an HP compressor 24) and a turbine section includes one or more turbines (i.e., an HP turbine 28 and an LP turbine 30). The LP compressor 22 and HP compressor 24 of the compressor section, as well as the HP turbine 28 and the LP turbine 30 of the turbine section, are each rotatable about the longitudinal centerline 12 of the turbofan engine 10.

Additionally, the exemplary core 16 depicted in FIG. 5 includes a flowpath 114 extending between an inlet 116 and an outlet 118. Similar to the exemplary flowpath 96 defined by the structural member 94 (see FIG. 2), the exemplary flowpath 114 is configured as a bleed air flowpath 114, such that the inlet 116 is in airflow communication with the compressor section. Specifically, the inlet 116 of the exemplary flowpath 114 is in airflow communication with an aft end of the LP compressor 22. Additionally, for the exemplary embodiment depicted, the outlet 118 of the flowpath 114 is in airflow communication with the turbine section, or more particularly is in airflow communication with a turbine rear frame 90 of the turbine section.

Notably, the exemplary embodiment depicted in FIG. 5 does not show a structural member defining the flowpath 114. While in certain exemplary embodiments the exemplary core 16 depicted in FIG. 5 may include a structural member defining the flowpath 114 (and configured in substantially the same manner as the exemplary structural members 94 described above with reference to FIG. 2 and/or FIG. 3), in other exemplary embodiments, the exemplary core 16 depicted in FIG. 5 may not include a structural member defining the flowpath 114. In such an exemplary embodiment, the flowpath 114 may alternatively be defined by one or more suitable airflow conduits which may or may not add structural rigidity to the core 16.

An auxiliary turbine 120 is positioned in airflow communication with the flowpath 114 for extracting energy from a flow of bleed air therethrough. As is depicted, the auxiliary turbine 120 is offset from the longitudinal centerline 12 of the turbofan engine 10. Specifically, the auxiliary turbine 120 defines a central axis 122, the central axis 122 offset from the longitudinal centerline 12. It should be appreciated, however, that in other exemplary embodiments, the auxiliary turbine 120 may instead be configured as a "tip turbine" with one or more of the HP compressor 24 or HP turbine 28. As used herein, the term tip turbine refers to a turbine configured in an annular configuration around the HP compressor 24 or HP turbine 28, rotating coaxially with the HP compressor 24 or HP turbine 28. For example, a tip turbine may be configured in substantially the same manner as the auxiliary compressor 106 described above with reference to FIGS. 3 and 4. In such an embodiments, the tip turbine may include a solid ring fixed to radially outer ends of a stage of rotating rotor blades in the HP compressor 24 or HP turbine 28. Further, the tip turbine may include a plurality of circumferentially spaced blades attached to the ring such that a flow of air over the blades of the tip turbine rotates the ring and corresponding stage of HP compressor blades or HP turbine blades.

Referring still to the embodiment of FIG. 5, the exemplary flowpath 114 extends through the auxiliary turbine 120, such that the auxiliary turbine 120 is positioned directly in airflow communication within the flowpath 114. The auxiliary turbine 120 may allow for extracting energy from the flow of bleed air through the flowpath 114 and for providing such extracted energy to the one or more shafts of the core 16 of the turbofan engine 10. Specifically, the auxiliary turbine 120 may be configured in a similar manner as one or both of the HP turbine 28 or LP turbine 30. For example, the auxiliary turbine 120 may include sequential stages of rotor blades coupled to an auxiliary turbine shaft rotatable about the central axis 122 of the auxiliary turbine 120. The turbine shaft may, as is depicted schematically, be mechanically coupled to the HP shaft 34 through a gearbox 124 to assist with rotating the HP shaft 34. The gearbox 124 may be a fixed ratio gearbox, or alternatively may be a variable ratio gearbox.

Inclusion of the auxiliary turbine 120 may allow for energy extraction from the flow of bleed air through the flowpath 114. For example, the auxiliary turbine 120 may allow for extraction of energy from such bleed air and for providing such extracted energy directly to the HP shaft 34. Accordingly, such a configuration may allow for a more efficient operation of the core 16 of the turbofan engine 10. For example, such a configuration may allow for the flow of bleed air through the flowpath 114 to power the HP shaft 34 during, e.g., idle conditions such that less fuel is required to operate the core 16 during idle conditions.

It should be appreciated, however, that the exemplary core 16 and auxiliary turbine 120 depicted in FIG. 5 is provided by way of example only. In other exemplary embodiments, for example, the auxiliary turbine 120 may instead be configured to provide the extracted energy from the flow of bleed air to the HP shaft 34 via an accessory gear box. For example, the auxiliary turbine may be mounted to the accessory gear box. With such a configuration, the auxiliary turbine 120 may serve a dual function of also being configured as an air starter/generator of the accessory gear box, which may be configured for starting the turbofan engine 10. Rotation of the auxiliary turbine may transfer the extracted energy to the HP shaft 34.

Figure 6:
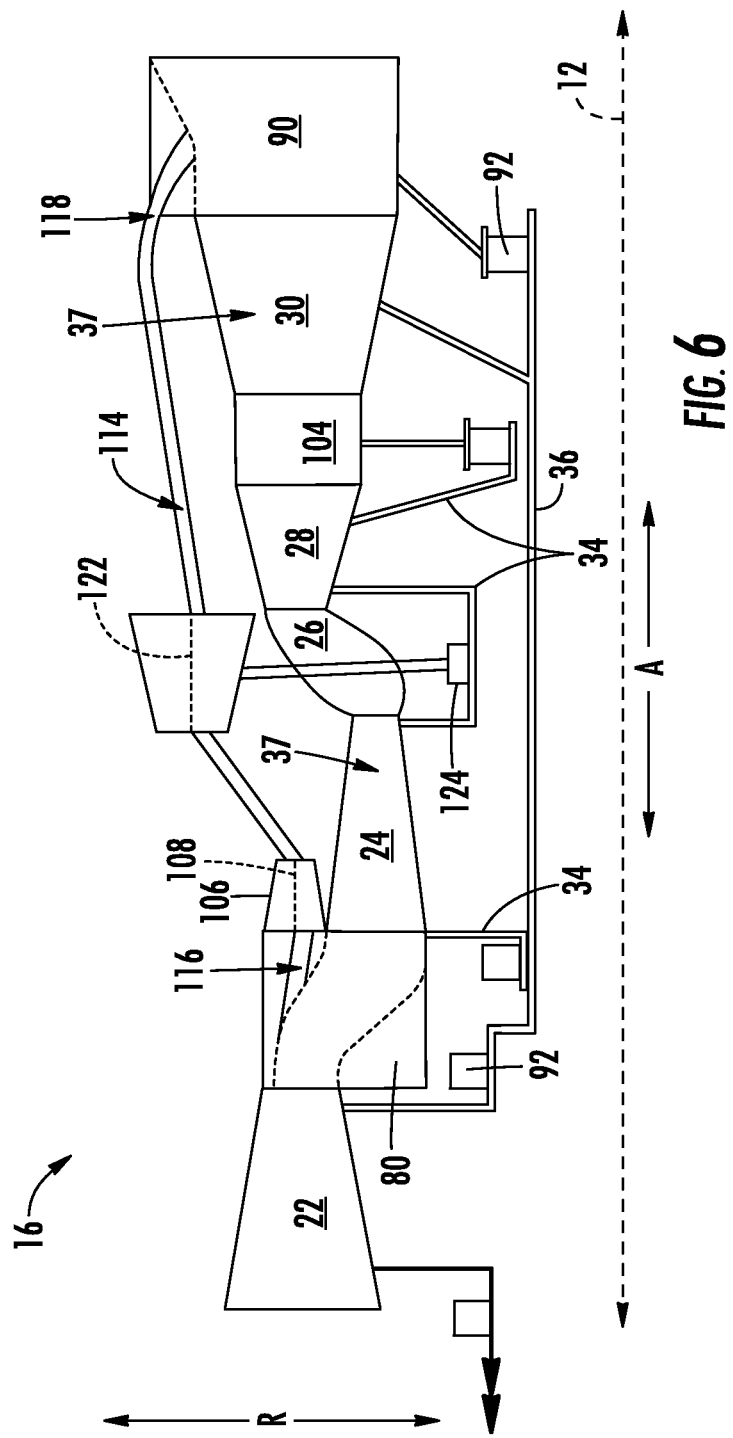
FIG. 6 is a simplified, schematic view of a core of a gas turbine engine in accordance with still another exemplary embodiment of the present disclosure.

Moreover, in still other exemplary embodiments, the core 16 depicted in FIG. 5 may additionally include one or more aspects of the exemplary core 16 described above with reference to FIGS. 2 through 4. For example, referring now to FIG. 6, providing a simplified, schematic view of a core 16 of a turbofan engine 10 in accordance with still another exemplary embodiment of the present disclosure, the exemplary core 16 includes an auxiliary turbine 120 as well as an auxiliary compressor 106—the auxiliary compressor 106 also in airflow communication with the flowpath 114. For the embodiment of FIG. 6, the auxiliary compressor 106 defines a central axis 108 offset from the longitudinal centerline 12 of the turbofan engine 10 and is driven by the one or more shafts of the core 16 of the turbofan engine 10. Alternatively, however, as with the embodiment described above, the auxiliary compressor 106 may be configured as a core-driven auxiliary compressor with the HP compressor 24. Additionally, for the embodiment of FIG. 6, the inlet 116 of the flowpath 114 is in airflow communication with the compressor frame member 80 downstream of the LP compressor 22 and upstream of the HP compressor 24, and the outlet 118 is in airflow communication with the turbine rear frame 90. However, in other exemplary embodiments, the outlet 118 of the flowpath 114 may instead be in airflow communication with, e.g., atmosphere or a bypass airflow passage 56 (see FIG. 1). For example, the auxiliary turbine 120 and flowpath 114 depicted may be enclosed by the outer casing 18 of the core 16 (as with the exemplary embodiments of FIGS. 2 and 3), and the outlet 118 of the flowpath 114 may be defined in the outer casing 18.

Figure 7:
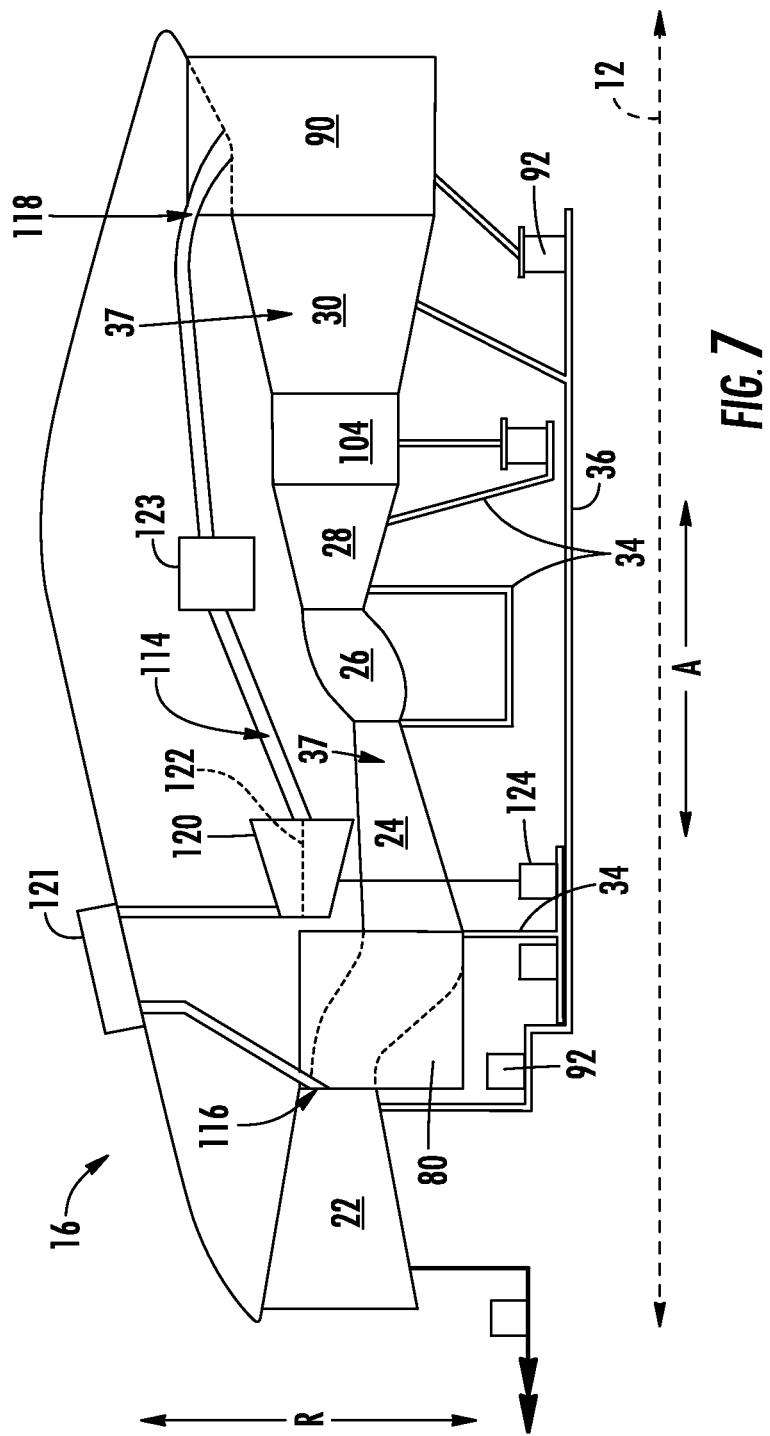
FIG. 7 is a simplified, schematic view of a core of a gas turbine engine in accordance with yet another exemplary embodiment of the present disclosure.

Furthermore, referring now to FIG. 7, another exemplary embodiment of the present disclosure is provided. Specifically, FIG. 7 provides a simplified, schematic view of a core 16 of a turbofan engine 10 in accordance with yet another exemplary embodiment of the present disclosure. The core 16 of the exemplary embodiment of FIG. 7 may be configured in substantially the same manner as the exemplary core 16 described above with reference to FIG. 5. Accordingly, the same or similar numbering may refer to the same or similar components.

For example, the exemplary core 16 of FIG. 7 includes a compressor section, a combustion section 26 located downstream of the compressor section, and a turbine section located downstream of the combustion section 26. The compressor section includes one or more compressors (i.e., an LP compressor 22 and an HP compressor 24) and the turbine section includes one or more turbines (i.e., an HP turbine 28 and an LP turbine 30). The LP compressor 22 and HP compressor 24 of the compressor section, as well as the HP turbine 28 and the LP turbine 30 of the turbine section, are each rotatable about a longitudinal centerline 12 of the turbofan engine 10.

Additionally, the exemplary core 16 depicted in FIG. 5 includes a flowpath 114 extending between an inlet 116 and an outlet 118, with an auxiliary turbine 120 positioned in the flowpath 114 between the inlet 116 and the outlet 118. The flowpath 114 and auxiliary turbine 120 may be configured in the same manner as the exemplary flowpath 114 and auxiliary turbine 120 described above with reference to FIG. 5.

In addition, the exemplary core 16 of FIG. 7 includes a first heat exchanger 121 positioned in thermal communication with the flowpath 114 at a location upstream of the auxiliary turbine 120, and a second heat exchanger 123 in thermal communication with the flowpath at a location downstream of the auxiliary turbine 120. For the embodiment depicted, the first heat exchanger 121 is configured to remove heat from a flow of bleed air through the flowpath 114. The first heat exchanger 121 may be configured as an "air to air" heat exchanger also in thermal communication with a bypass airflow of the turbofan engine 10 (similar to the bypass airflow 64 described above with reference to FIG. 1). For example, the first heat exchanger 121 may be positioned within a bypass passage (as is depicted in FIG. 7), or alternatively may be positioned within the outer casing 18 of the core 16. With such an embodiment, a portion of the bypass airflow may instead be redirected from the bypass passage over the first heat exchanger 121.

The cooled and compressed bleed air may then flow through the flowpath 114 to the auxiliary turbine 120, where the bleed air may be expanded as energy is extracted from such flow of bleed air. The expansion of the bleed air through the auxiliary turbine 120 may further reduce a temperature of the bleed air. The bleed air may then flow through the flowpath 114 to the second heat exchanger 123 (at a location downstream from the auxiliary turbine 120), where the temperature of the bleed air in the flowpath 114 is increased as the second heat exchanger 123 removes heat from one or more systems of the turbofan engine 10 and transfers such heat to the bleed air in the flowpath 114. For example, in certain exemplary embodiments, the second heat exchanger 123 may be configured as a "liquid to air" heat exchanger configured to transfer heat from, e.g., a main lubrication system or a fuel system of the turbofan engine 10 to the bleed air in the flowpath 114.

The bleed air in the flowpath 114 is then provided to the aft turbine block 90. However, in other embodiments, the bleed air may instead be provided at any other suitable location of the turbine section. For example, in certain exemplary embodiments, the core 16 may further include an auxiliary compressor in airflow communication with the flow of bleed air in the flowpath 114 for increasing a pressure of such flow. With such a configuration, the flow of air may instead be provided to, e.g., the LP turbine 30 in much the same manner as described above with reference to one or more of the embodiments of FIGS. 2 through 4.

Figure 8:
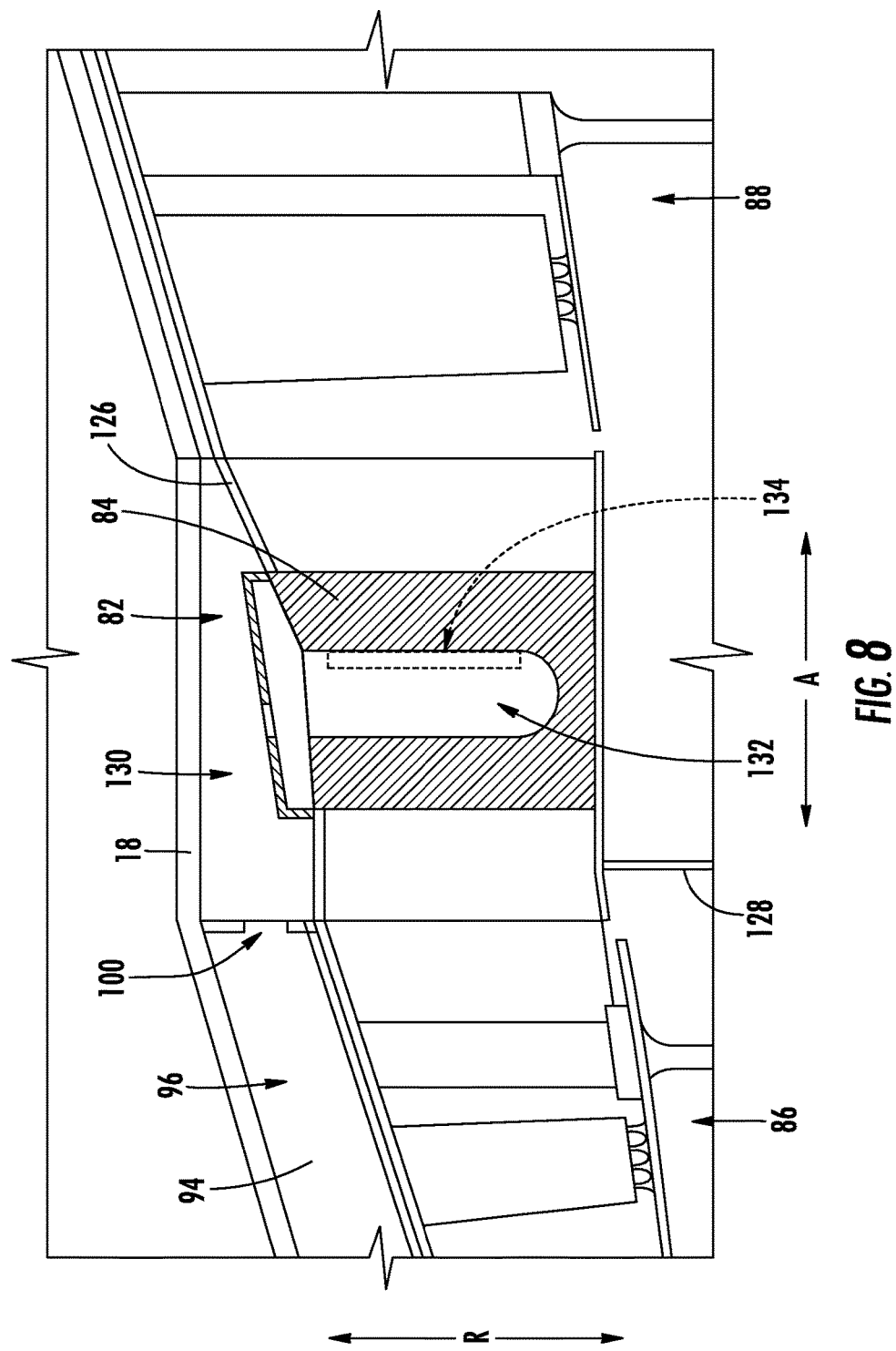
FIG. 8 is a close-up, schematic view of an airflow injection nozzle of a stage of airflow injection nozzles in accordance with an exemplary embodiment of the present disclosure.

Referring now to FIG. 8, a close-up, schematic view of a stage 82 of airflow injection nozzles in accordance with an exemplary embodiment of the present disclosure is provided. The exemplary stage 82 of airflow injection nozzles 84 depicted in FIG. 8 is located within the turbine section, downstream of the first turbine, i.e. the HP turbine 28. Specifically, for the embodiment depicted, the exemplary stage 82 of airflow injection nozzles 84 is located between a forward block 86 of the LP turbine 30 and an aft block 88 of the LP turbine 30.

Additionally, as shown, the stage 82 of airflow injection nozzles 84 is in airflow communication with an outlet of a flowpath. For the embodiment depicted, the flowpath is a flowpath 96 defined by a structural member 94 of the core 16 of the turbofan engine 10. Accordingly, the exemplary stage 82 of airflow injection nozzles 84 may be incorporated into one or more of the exemplary turbofan engines 10 described above with reference to FIGS. 2 and/or 3. Alternatively, however, in other embodiments the stage 82 of airflow injection nozzles 84 may be located at any other suitable location within the turbine section, such as in a turbine rear frame 90 of the turbine section. Accordingly, with such an exemplary embodiment the stage 82 of airflow injection nozzles 84 may instead be incorporated into one or more of the exemplary turbofan engines 10 described above with reference to FIGS. 4 and/or 5.

Referring still to FIG. 8, for the exemplary embodiment depicted, each nozzle 84 in the stage 82 of airflow injection nozzles 84 is configured as a structural vane of the turbine section. Specifically, each nozzle 84 in the stage 82 of airflow injection nozzles 84 extends generally along the radial direction R through the core air flowpath 37, providing a structural connection between an outer liner 126 of the turbine section and a turbine frame member 128. However, in other embodiments, one or more of the nozzles 84 in the stage 82 of airflow injection nozzles 84 may additionally, or alternatively, be configured as non-structural nozzles. In such an embodiment, the nozzles 84 may, or may not, extend completely through the core air flowpath 37 along the radial direction R.

The stage 82 of airflow injection nozzles 84 may include a plurality of airflow injection nozzles 84 spaced along a circumferential direction of the turbofan engine 10. For example, the stage 82 of airflow injection nozzles 84 may include six or more nozzles 84, fourteen or more nozzles 84, fifty or more nozzles 84, eighty or more nozzles 84, one hundred or more nozzles 84, or one hundred and fifty or more nozzles 84. Additionally, the stage 82 of airflow injection nozzles 84 generally includes a chamber 130 at a radially outer end. The chamber 130 may be an annular chamber extending substantially along the circumferential direction of the turbofan engine 10. The annular chamber 130 may allow for each airflow injection nozzle in the stage 82 of airflow injection nozzles 84 to be in airflow communication with the outlet 100 of the flowpath 96.

Additionally, each nozzle in the stage 82 of airflow injection nozzles 84 generally includes a cavity 132 extending through the respective nozzle 84 generally along the radial direction R and an opening 134 (depicted in phantom). The air from the annular chamber 130 may flow into the hollow cavity 132 and out through the opening 134 into the turbine section, or more particularly, into a portion of the core air flowpath 37 extending through the turbine section. Accordingly, the opening 134 of each nozzle 84 in the airflow injection nozzles 84 may be configured to inject a flow of bleed air extracted from the compressor section into the core air flowpath 37 extending through the turbine section. For the embodiment depicted, each opening 134 defined by a respective nozzle 84 extends generally along the radial direction R, substantially along a length of the respective nozzle 84. However, in other embodiments, each nozzle 84 may instead include a plurality of openings 134 spaced generally along the radial direction R.

Notably, as the stage 82 of airflow injection nozzles 84 are configured to reintroduce bleed air from the flowpath 96, in at least certain exemplary embodiments, the stage 82 of airflow injection nozzles 84 may define a maximum mass flow rate therethrough equal to the maximum mass flow rate of the flowpath 96, such as the maximum mass flow rate of the flowpath 96 described above with reference to FIG. 2.

Figure 9:
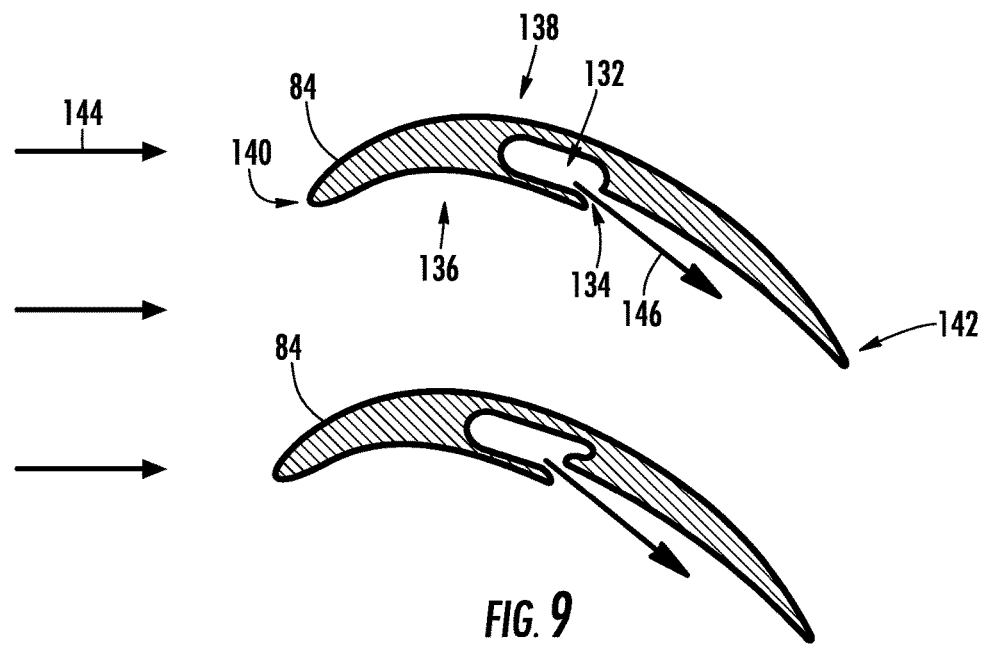
FIG. 9 is a cross-sectional view of a pair of airflow injection nozzles in accordance with an exemplary embodiment of the present disclosure.

Referring now specifically to FIG. 9, a cross-sectional view of a pair of nozzles 84 in accordance with one exemplary embodiment of the present disclosure, taken generally along the radial direction R, is provided. For example, the nozzles 84 of FIG. 9 may be incorporated into the stage 82 of airflow injection nozzles 84 described above with reference to FIG. 8.

For the embodiment of FIG. 9, the nozzles 84 are fixed throughput nozzles 84, each defining a fixed opening 134. The nozzles 84 depicted define a pressure side 136 and a suction side 138, as well as a leading end 140 and a trailing end 142. The leading end 140 is located upstream of the trailing end 142 in the airflow through the core air flowpath 37. Additionally, the opening 134 of each respective nozzle 84 is located on the pressure side 136 of the respective nozzle 84 and is oriented generally in a flow direction 144 of the airflow through turbine section (i.e., through a portion of the core air flowpath 37 extending through the turbine section). Such a configuration may allow for injection of the flow of bleed air extracted/bled from the compressor section into the core air flowpath 37 extending through the turbine section in a direction (as indicated by arrows 146) flowing with the airflow through the turbine section so as to cause minimal disruption to such airflow.

It should be appreciated, however, that in other exemplary embodiments, the injection nozzles 84 may have any other suitable configuration. For example, in other exemplary embodiments the nozzles 84 may instead be variable throughput nozzles 84. Specifically, referring now to FIGS. 10 and 11, cross-sectional views of a pair of nozzles 84 in accordance with another exemplary embodiment of the present disclosure are provided, also taken generally along the radial direction R. The exemplary airflow injection nozzles 84 may be configured in substantially the same manner as the exemplary airflow injection nozzles 84 described above with reference to FIG. 9, and thus the same or similar numbering may refer to the same or similar part.

Figure 10:
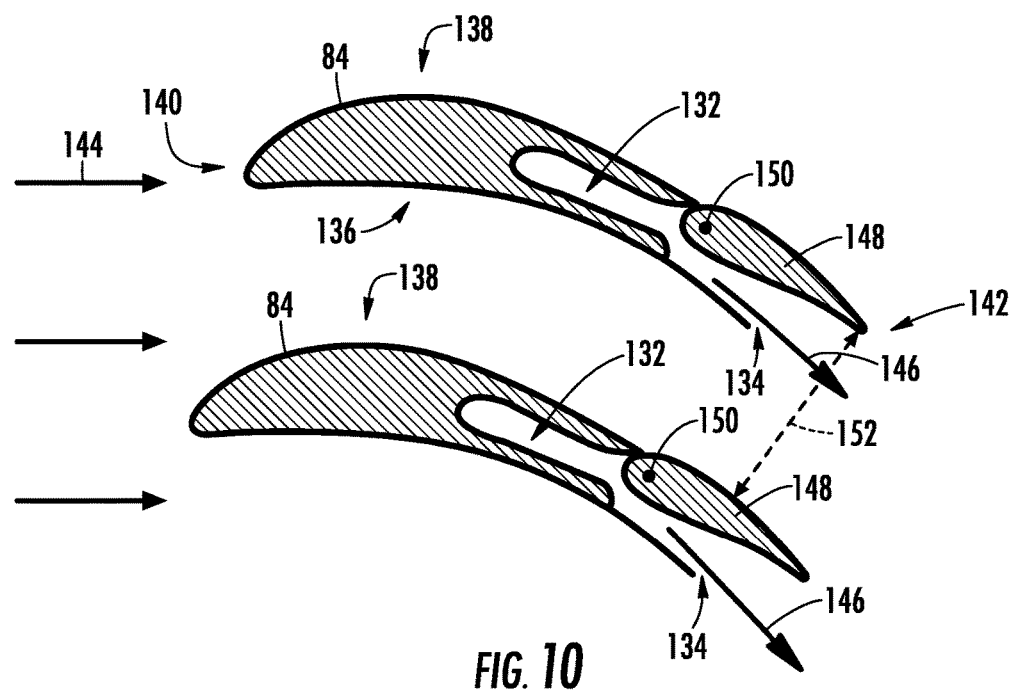
FIG. 10 is a cross-sectional view of a pair of airflow injection nozzles in accordance with another exemplary embodiment of the present disclosure.
Figure 11:
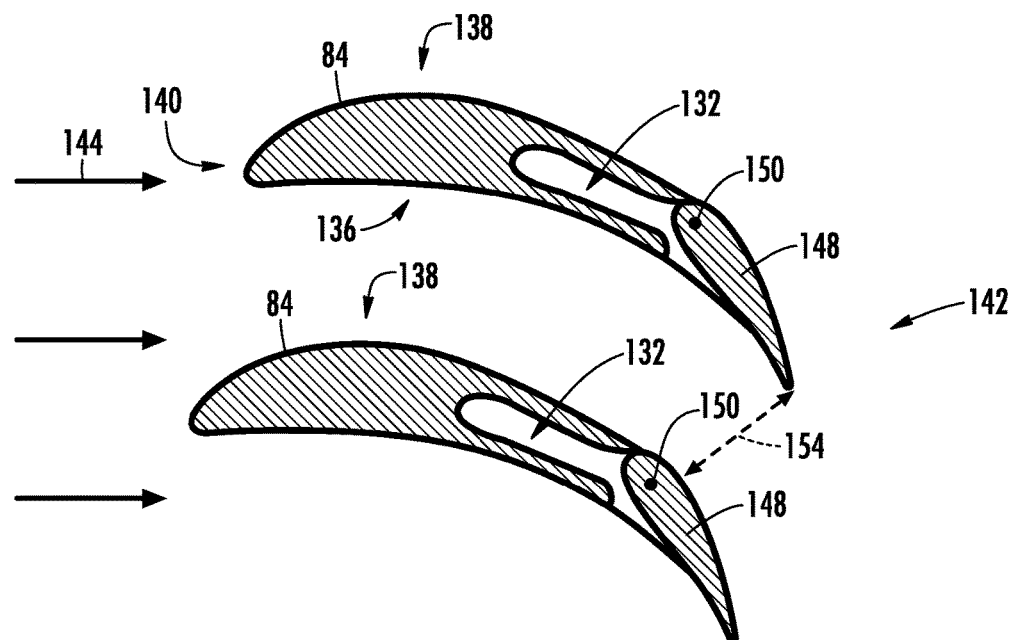
FIG. 11 is another cross-sectional view of the pair of exemplary airflow injection nozzles of FIG. 10.

However, the exemplary nozzles 84 of FIGS. 10 and 11 are configured to allow for variation in an amount of airflow allowed therethrough. Specifically, the openings 134 of the exemplary nozzles 84 of FIGS. 10 and 11 are variable throughput openings 134 positioned proximate a trailing end 142 of the respective nozzle 84. As shown, the exemplary nozzles 84 of FIGS. 10 and 11 each include a flap 148 positioned at the trailing end 142 of the respective nozzle. Each flap 148 is pivotable generally about a pivot axis 150 (which may be parallel to the radial direction R) between a first position, or open position (see FIG. 10), and a second position, or closed position (see FIG. 11). When the flap is in the open position, a maximum amount of air, such as bleed air, may flow therethrough. By contrast, when in the closed position, the flap 148 is positioned over and blocks a flow of air through the opening 134 of the respective nozzle 84. Each flap 148 may also be movable to a variety of positions between the first position and second position to adjust an amount of air allowed through the stage 82 of airflow injection nozzles 84. The variable throughput openings 134 in the nozzles 84 depicted in FIGS. 10 and 11 may be used in conjunction with, or instead of, a valve in a flowpath (such as the valve 102 in the flowpath 96) providing bleed air thereto.

Moreover, the flaps 148 of the nozzles 84 in the stage 82 of airflow injection nozzles 84 may also control a flow of air through the core air flowpath 37 of the turbine section. Specifically, each pair of adjacent nozzles 84 defines a nozzle throat area, which can affect a capacity of the turbine section. Each pair of adjacent nozzles 84 defines a maximum nozzle throat area 152 when the flaps 148 are in the first, open position and a minimum nozzle throat area 154 when the flaps 148 are in the second, closed position. Accordingly, the flaps 148 are configured to decrease the nozzle throat area when moved to the second, closed position, which may decrease a capacity of the turbine section. When the HP shaft 34 of the turbofan engine 10 is operating at a relatively low speed, the airflow injection nozzles 84 may be operated to increase the nozzle throat area to increase the capacity of the LP turbine 30. Alternatively still, referring now to FIGS. 12 and 13, cross-sectional views of a pair of nozzles 84 in accordance with yet another exemplary embodiment of the present disclosure are provided, also taken generally along the radial direction R. The exemplary airflow injection nozzles 84 may be configured in substantially the same manner as the exemplary airflow injection nozzles 84 described above with reference to FIG. 9, and thus the same or similar numbering may refer to the same or similar part.

Figure 12:
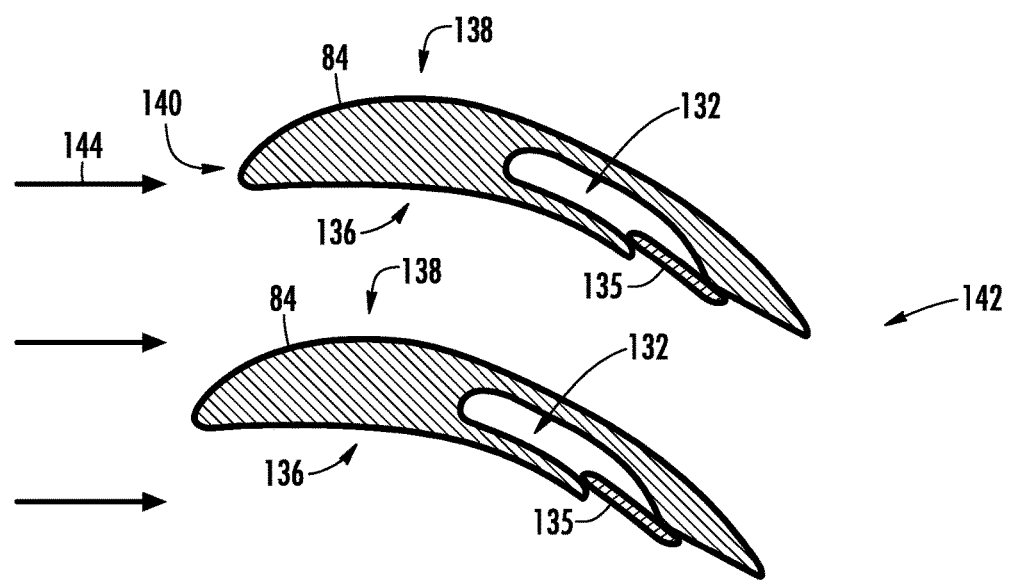
FIG. 12 is a cross-sectional view of a pair of airflow injection nozzles in accordance with yet another exemplary embodiment of the present disclosure.
Figure 13:
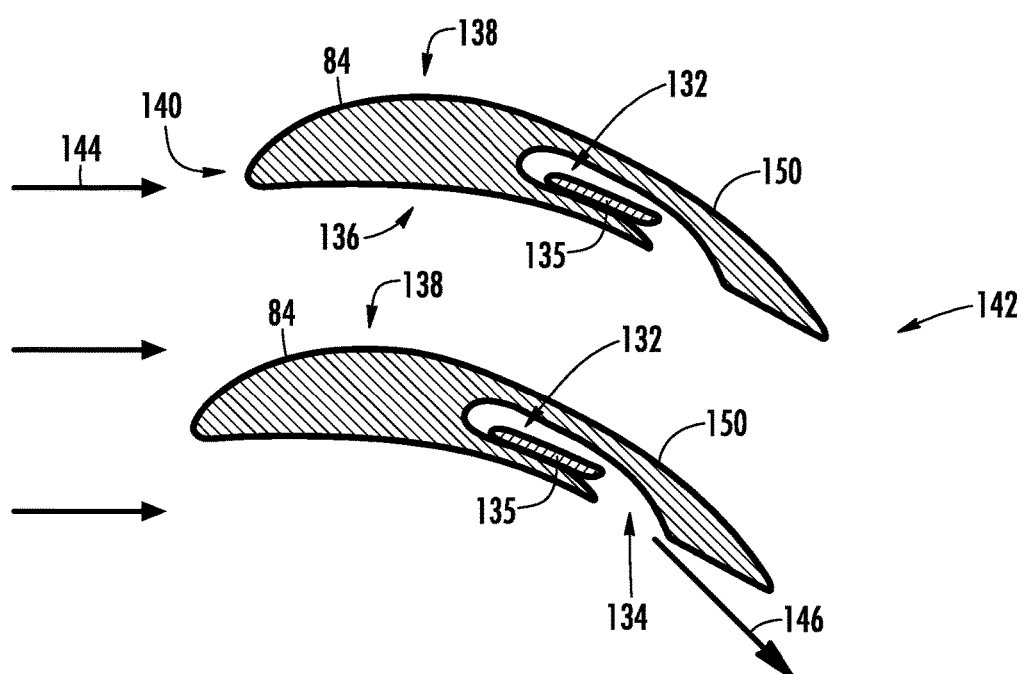
FIG. 13 is another cross-sectional view of the pair of exemplary airflow injection nozzles of FIG. 12

As with the exemplary nozzles 84 of FIGS. 10 and 11, the exemplary nozzles 84 of FIGS. 12 and 13 are configured as variable throughput nozzles, such that the nozzles 84 are configured to allow for a variation in an amount of airflow allowed therethrough. Specifically, each of the exemplary nozzles 84 include a variable throughput opening 134 positioned proximate a trailing end 142 of the respective nozzle 84 with a blocker door 135 slidable between a closed position (FIG. 12) and an open position (FIG. 13), as well as a number of positions therebetween. The nozzles 84 may therefore adjust an amount of air allowed through the stage 82 of airflow injection nozzles 84 by moving the blocker doors 135 to a desired position. The variable throughput openings 134 in the nozzles 84 depicted in FIGS. 12 and 13 may be used in conjunction with, or instead of, a valve in a flowpath (such as the valve 102 in the flowpath 96).

Figure 14:
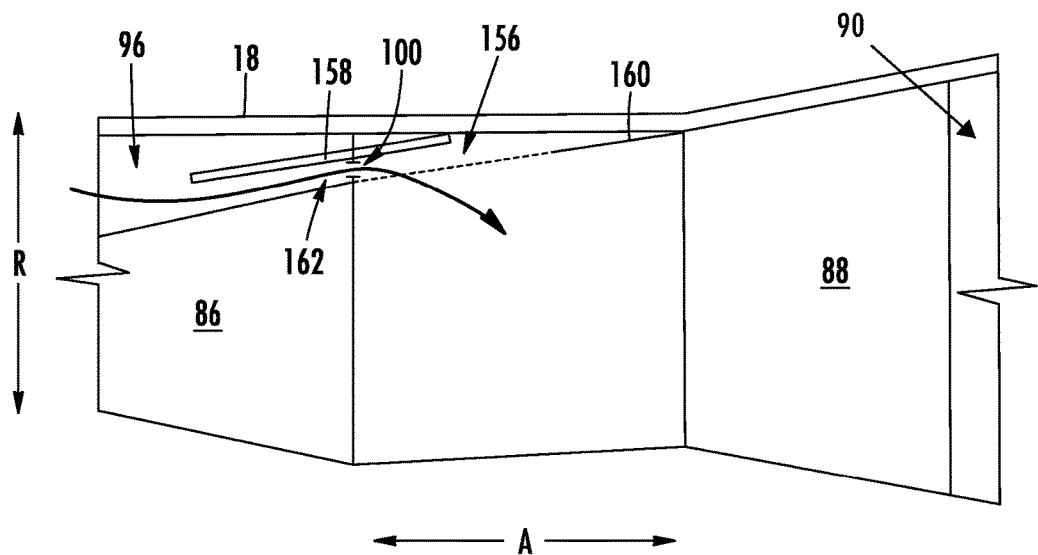
FIG. 14 is a close-up, schematic view of a turbine rear frame member in accordance with an exemplary embodiment of the present disclosure.
Figure 15:
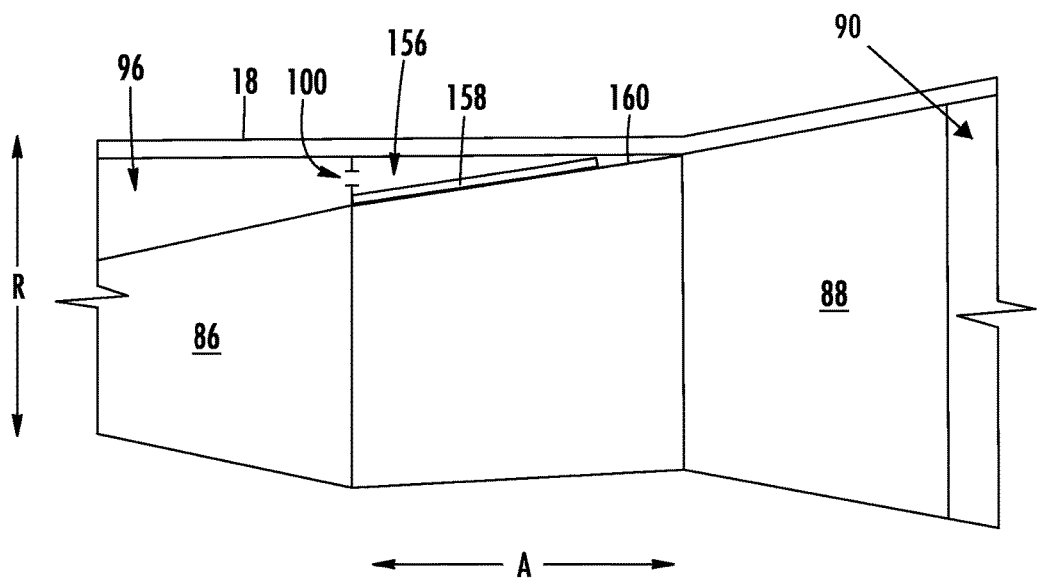
FIG. 15 is another close-up, schematic view of the exemplary turbine rear frame member of FIG. 14.

Referring now to FIGS. 14 and 15, an alternative embodiment is provided for injecting a flow of bleed air extracted from the compressor section back into the core air flowpath 37 extending through the turbine section. FIG. 14 provides a simplified, schematic view of a turbine frame member 104 located downstream of an HP turbine 28 and upstream of an LP turbine 30. The turbine frame member 104 defines a cavity 156 in airflow communication with an outlet of a flowpath. For the exemplary embodiment depicted, the cavity 156 is in airflow communication with the outlet 100 of the flowpath 96 defined by the structural member 94, such as those described above with reference to FIGS. 2 and/or 3. Alternatively, however, the cavity 156 may be in airflow communication with the bleed air flowpath 114 described above with reference to FIGS. 4 and 5.

The exemplary turbine frame member 104 generally includes a door 158 on an outer liner 160, the outer liner 160 at least partially defining the core air flowpath 37 through the turbine section. The door 158 is movable generally along the axial direction A of the turbofan engine 10 between a forward, open position (see FIG. 14) and an aft, closed position (see FIG. 15). When the door 158 is in the forward, open position, the door 158 defines an opening 162 from the flowpath 96 in cavity 156 to the core air flowpath 37 extending through the turbine frame member 104 to allow for injection/reintroduction of bleed air from the flowpath 96. By contrast, when the door 158 is in the aft, closed position, the door 158 forms a seal with the turbine outer liner 160, such that no airflow may be provided from the cavity 156 or flowpath 96 therethrough into the core air flowpath 37 through the turbine frame member 104. Such may be a simple and economic configuration for injecting bleed air from the flowpath 96 into the core air flowpath 37 extending through the turbine frame member 104.

In certain exemplary embodiments, the turbine frame member 104 may include a plurality of doors 158, each movable generally along the axial direction A between an open position and a closed position. The plurality of doors 158 may be spaced along the circumferential direction of the turbofan engine 10. Additionally, although the turbine frame member 104 including the movable door 158 is located between the HP turbine 28 and LP turbine 30, in other exemplary embodiments, the turbine frame member 104 including a movable door 158 may instead be located, e.g., between the forward block of the LP turbine and the aft block of the LP turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a compressor section including one or more compressors;
a combustion section located downstream of the compressor section;
a turbine section located downstream of the combustion section and including one or more turbines;
a bleed air flowpath extending between an inlet and an outlet, the inlet in airflow communication with the compressor section for receiving a flow of bleed air from the compressor section;
an auxiliary turbine positioned in airflow communication with the bleed air flowpath between the inlet of the bleed air flowpath and the outlet of the bleed air flowpath for extracting energy from the flow of bleed air through the bleed air flowpath; and
one or more shafts mechanically coupling the compressor section and the turbine section, wherein the auxiliary turbine is mechanically coupled to at least one of the one or more shafts for adding power to the at least one of the one or more shafts; and
an auxiliary compressor in airflow communication with the bleed air flowpath and configured as a core driven auxiliary compressor, wherein the auxiliary turbine is mechanically coupled to the one or more shafts independently of the auxiliary compressor.

2. The gas turbine engine of claim 1, further comprising a structural member extending from the compressor section to the turbine section adding structural support to the gas turbine engine, the structural member defining the bleed air flowpath.

3. The gas turbine engine of claim 1, further comprising a valve positioned in the bleed air flowpath, wherein the valve is configured to vary an amount of bleed airflow allowed through the bleed air flowpath.

4. The gas turbine engine of claim 1, further comprising a heat exchanger in thermal communication with the bleed air flowpath at a location upstream of the auxiliary turbine for reducing a temperature of the flow of bleed air therethrough; and
a heat exchanger in thermal communication with the bleed air flowpath at a location downstream of the auxiliary turbine for increasing a temperature of the flow of bleed air therethrough.

5. The gas turbine engine of claim 1, wherein the compressor section, the combustion section, and the turbine section are each enclosed within an outer casing, and wherein the bleed air flowpath and auxiliary turbine are also enclosed within the outer casing.

6. The gas turbine engine of claim 1, wherein auxiliary turbine is configured as a tip turbine.

7. The gas turbine engine of claim 1, wherein the outlet of the bleed air flowpath is in airflow communication with the turbine section of the gas turbine engine.

8. The gas turbine engine of claim 1, wherein the outlet of the bleed air flowpath is in airflow communication with an aft frame member of the turbine section of the gas turbine engine.

9. The gas turbine engine of claim 1, wherein the turbine section includes a high pressure turbine, a low pressure turbine, and a stage of airflow injection nozzles, and wherein the outlet of the bleed air flowpath is in airflow communication with the stage of airflow injection nozzles.

10. A gas turbine engine comprising:
a compressor section including one or more compressors;
a turbine section located downstream of the compressor section and including one or more turbines;
a bleed air flowpath extending between an inlet and an outlet, the inlet in airflow communication with the compressor section for receiving up to at least five percent of an airflow through the compressor section;
an auxiliary turbine positioned in airflow communication with the bleed air flowpath between the inlet of the bleed air flowpath and the outlet of the bleed air flowpath for extracting energy from a flow of bleed air through the bleed air flowpath; and
one or more shafts mechanically coupling the compressor section and the turbine section, wherein the auxiliary turbine is mechanically coupled to at least one of the one or more shafts for adding power to the at least one of the one or more shafts; and
an auxiliary compressor in airflow communication with the bleed air flowpath and configured as a core driven auxiliary compressor, wherein the auxiliary turbine is mechanically coupled to the one or more shafts independently of the auxiliary compressor.

11. The gas turbine engine of claim 10, further comprising a structural member extending from the compressor section to the turbine section for strengthening the gas turbine engine, the structural member defining the bleed air flowpath.

12. The gas turbine engine of claim 10, further comprising a valve positioned in the bleed air flowpath, wherein the valve is configured to vary an amount of bleed airflow allowed through the bleed air flowpath.

13. The gas turbine engine of claim 10, further comprising a heat exchanger in thermal communication with the bleed air flowpath.

14. The gas turbine engine of claim 10, wherein the outlet of the bleed air flowpath is in airflow communication with the turbine section of the gas turbine engine.

15. The gas turbine engine of claim 10, wherein the outlet of the bleed air flowpath is in airflow communication with an aft frame member of the turbine section of the gas turbine engine.

* * * * *